UNITED STATES PATENT OFFICE.

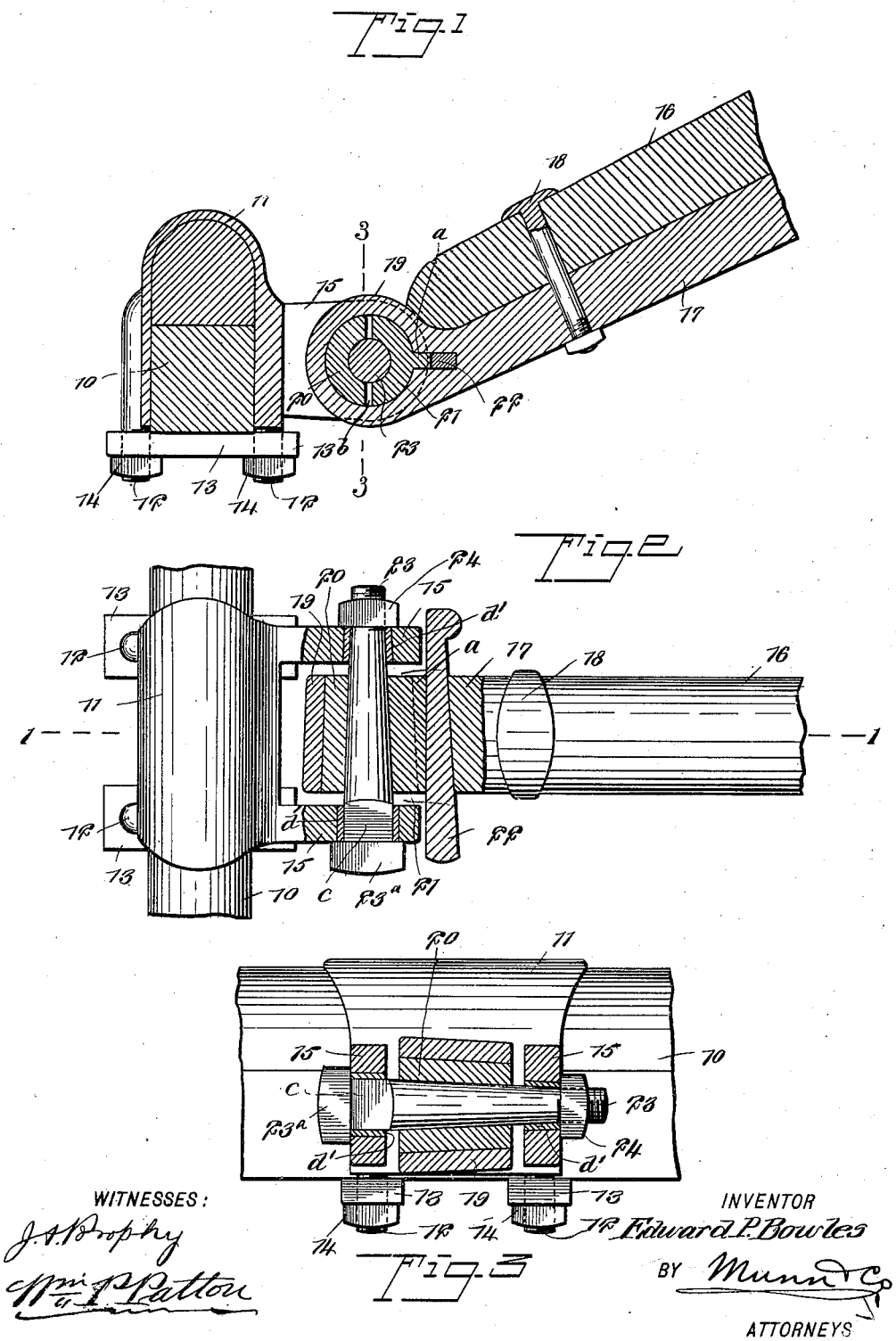

EDWARD PERRY BOWLES, OF WOLFVILLE, CANADA.

THILL-COUPLING.

SPECIFICATION forming part of Letters Patent No. 685,564, dated October 29, 1901.

Application filed August 16, 1901. Serial No. 72,257. (No model.)

*To all whom it may concern:*

Be it known that I, EDWARD PERRY BOWLES, a subject of the King of England, and a resident of Wolfville, in the Province of Nova Scotia and Dominion of Canada, have invented a new and Improved Thill-Coupling, of which the following is a full, clear, and exact description.

The object of this invention is to provide an improved coupling device for connection of the thills or shafts of a vehicle with the running-gear of the same, so as to prevent improper looseness at the joints and obviate the rattling incident to couplings of ordinary construction; and a further object is to provide a device of the indicated character which is simple, strong, durable, and having convenient means for adjustment of working parts to take up wear in any direction such wear is liable to occur.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a longitudinal sectional view of the improved thill-coupling substantially on the line 1 1 in Fig. 2. Fig. 2 is a plan view of the same, and Fig. 3 is a transverse sectional view substantially on the line 3 3 in Fig. 1.

As usual, two similar thill-couplings comprise the set for connection of a pair of thill-shafts or a tongue with the running-gear of a vehicle, and as these two couplings are duplicates of each other a description of one thill-coupling embodying the improvement will suffice for both.

Referring to the drawings, 10 indicates the front axle of a vehicle and 11 one of two similar clip-bands secured thereon for attachment of the duplicate thill-couplings thereto. The clip-band 11 embraces the axle 10, and from the front and rear faces thereof bolt extensions 12 project down below the axle-body for reception of the clamping-plates 13, that are perforated to receive the bolt extensions and are secured in place by the nuts 14, which screw on the ends of the bolts 12. From the ends of the clip-band 11 two lugs 15 extend forwardly parallel with each other and at right angles to the axle 10.

16 represents one of a pair of thills, and 17 the thill-iron, of usual form, secured upon the end of the thill it is lapped upon by bolts 18, one of said bolts being shown in Figs. 1 and 2 of the drawings. A tubulated formation 19 is produced upon the end of the thill-iron 17 and projects sufficiently from the rear end of the thill 16 to be freely introduced between the lugs 15. The tubulated formation 19 is in the form of a cylindrical boss transversely bored, and said bore is rendered coniform for close-fitted reception of a bisected box, as shown clearly in Figs. 1 and 3, said box comprising two half-shells 20 21. The tapering bore in the boss 19 is horizontally grooved in the forward side to receive an integral lip-flange $a$, that extends from the half-shell 21, and also to accommodate a wedge-shaped key 22, that is parallel on the upper and lower sides and of a thickness which adapts it to fit loosely within the groove. The key 22 bears with its true rear edge upon the straight front edge of the lip-flange $a$ and has its sloped forward edge in contact with the front cross-wall of the groove in the boss 19, said key being provided with a lateral head on the smaller end, which prevents its accidental displacement.

The two-part box 20 21 is coniform in its bore and receives the coniform shackle-bolt 23, that fits neatly therein when the two half-shells of the box are gapped apart somewhat at their adjacent edges, as indicated at $b$ in Fig. 1. The coniform body of the shackle-bolt 23 also passes through opposite orifices in the lugs 15, and at the larger end of the bolt, whereon the head $23^a$ is formed, the bolt-body is preferably squared, as at $c$, where it passes through the orifice in the lug 15, which is of similar shape, which engagement prevents the shackle-bolt from turning in the lugs. The smaller tapering end portion of the shackle-bolt 23 projects exterior of the lug 15 it passes through, and said extension of the bolt is threaded, a nut 24 being screwed thereon to hold the bolt secured in place, as shown in Figs. 2 and 3. If preferred, the orifices in the lugs 15 may be lined, said linings $d'$ being of any suitable metal; but the half-shells 20 21 are of such metal or composition of metals as will adapt them to resist wear from friction as effectively as possible. The taper of the bore in the boss is in the same direction as that of the shackle-bolt 23, so that the half-shells 20 and 21 are held against end play when arranged for service.

It will be seen that if a pair of thills is provided with duplicate couplings of the described construction and the tapered bodies of the box-shells and also of the shackle-bolts 23 have their smaller ends nearest to each other the thill-irons 17 will be held free to rock between the lugs 15 and be prevented from lateral play, that would cause frictional engagement of the bosses 19 with the lugs 15. Furthermore, it is evident that any looseness due to wear of the half-shells 20 21 may be readily taken up by adjustment of the keys 22 in an obvious manner.

Having thus described my invention, I claim as new and desire to secure by Letters Patent—

1. A thill-coupling, comprising a securable clip-band having two spaced lugs, a thill-iron securable on a thill, a bisected box held in a tubulation on the end of a thill-iron, a tapered shackle-bolt passing through the bisected box and the lugs, means to secure the bolt in place, and a key bearing on the box for contracting it on the shackle-bolt.

2. A thill-coupling comprising a securable clip-band, two spaced lugs projected from the clip-band, a tapered shackle-bolt held transversely in the lugs, a thill-iron having a tubulated end, separate half-boxes in the tubulation and fitted on the tapered shackle-bolt, one box-section having a flange projecting therefrom, and a tapered key held to slide in the thill-iron and contact with said flange for contracting the bore of the two-part box.

3. A thill-coupling, comprising a clip-band held on a vehicle-axle, spaced lugs projected from the clip-band, a tapered shackle-bolt held in orifices in the lugs by a nut on the smaller end of the bolt, the larger end of said bolt being flat-sided to engage a squared perforation or orifice in an appropriate lug, a thill-iron having a taper-bored boss on one end, a bisected box fitted in the bore of the boss, one half-section of said box having a lateral lip-flange thereon engaged in a transverse groove in the bore of the thill end, and a wedge-key in said groove contacting with the edge of the lip-flange.

In testimony whereof I have signed my name to this specification in the presence of two subscribing witnesses.

EDWARD PERRY BOWLES.

Witnesses:
RUPERT E. HARRIS,
AVARD V. PINEO.